United States Patent
Dillen et al.

(10) Patent No.: US 6,341,596 B1
(45) Date of Patent: Jan. 29, 2002

(54) LOCOMOTIVE TRANSIENT SMOKE CONTROL STRATEGY USING LOAD APPLICATION DELAY AND FUEL INJECTION TIMING ADVANCE

(75) Inventors: Eric R. Dillen; Shawn M. Gallagher, both of Erie; Vincent F. Dunsworth, Edinboro; Joseph T. Orinko, Erie, all of PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/560,592

(22) Filed: Apr. 28, 2000

(51) Int. Cl.⁷ .............................................. F02M 37/04
(52) U.S. Cl. ...................................... 123/500; 123/357
(58) Field of Search ....................... 123/357, 500–501, 123/370

(56) References Cited

U.S. PATENT DOCUMENTS

| | | | | |
|---|---|---|---|---|
| 4,346,688 A | * | 8/1982 | Kaibara et al. | 123/502 |
| 5,394,851 A | * | 3/1995 | Cryer et al. | 123/506 |
| 5,623,909 A | * | 4/1997 | Wertheimer | 123/501 |
| 5,680,842 A | * | 10/1997 | Schmid | 123/501 |
| 5,826,563 A | * | 10/1998 | Patel et al. | 123/481 |
| 6,021,756 A | * | 2/2000 | Nakamura | 123/501 |
| 6,158,416 A | * | 12/2000 | Chen et al. | 123/380 |

* cited by examiner

Primary Examiner—Thomas N. Moulis
(74) Attorney, Agent, or Firm—Carl A. Rowold, Esq.; John L DeAngelis, Esq.; Holland & Knight LLP

(57) ABSTRACT

An apparatus for reducing visible smoke in a railroad locomotive during throttle position changes. For key throttle position changes, the present invention introduces a temporary advance in injection timing and a delay in the application of additional current to the traction motors, thereby delaying the generation of additional horsepower requested by the new throttle position. These strategies of timing advance and load application delay are used together or separately to minimize transient visible smoke.

14 Claims, 5 Drawing Sheets

| BEG. SPEED | ENDING SPEED | | | | | | | | | | | | | |
|---|---|---|---|---|---|---|---|---|---|---|---|---|---|---|
| | LI 335 | ID 440 | N1 440 | N1A 580 | N2 580 | N2A 720 | N3 888 | N3A 995 | N4 888 | N4A 995 | N5 995 | N6,7,8/7 995 | N8 1050 |
| LI 335 | 0 | 5 | 7 | 12 | 15 | 17 | 28 | 30 | 40 | 42 | 45 | 50 | 60 |
| ID 440 | | 0 | 5 | 10 | 13 | 15 | 26 | 28 | 38 | 40 | 43 | 45 | 55 |
| N1 440 | | | 0 | 0 | 8 | 0 | 25 | 0 | 30 | 0 | 33 | 35 | 50 |
| N1A 580 | | | | 0 | 0 | 12 | 0 | 15 | 0 | 26 | 33 | 35 | 50 |
| N2 580 | | | | | 0 | 0 | 20 | 0 | 25 | 0 | 28 | 30 | 40 |
| N2A 720 | | | | | | 0 | 0 | 0 | 0 | 25 | 28 | 30 | 35 |
| N3 888 | | | | | | | 0 | 0 | 15 | 0 | 20 | 25 | 30 |
| N3A 995 | | | | | | | | 0 | 0 | 14 | 15 | 20 | 25 |
| N4 888 | | | | | | | | | 0 | 0 | 14 | 18 | 20 |
| N4A 995 | | | | | | | | | | 0 | 14 | 18 | 20 |

*FIG. 2*

| STARTING NOTCH | ENDING NOTCH | | | | | | | | | |
|---|---|---|---|---|---|---|---|---|---|---|
| | LOW IDLE | IDLE | 1 | 2 | 3 | 4 | 5 | 6 | 7 | 8 |
| LOW IDLE (335) | 335 | 440 | 1 | 2 | 3 | 4 | 5 | 6 | 7 | 8 |
| IDLE (440) | 0 | 0 | 1 | 3 | 3 | 4 | 4 | 4 | 4 | 4 |
| 1 | 0 | 0 | 0 | 2 | 3 | 4 | 4 | 4 | 4 | 4 |
| 2 | 0 | 0 | 0 | 2 | 4 | 4 | 4 | 4 | 4 | 4 |
| 3 | 0 | 0 | 0 | 0 | 5 | 5 | 3 | 3 | 3 | 3 |
| 4 | 0 | 0 | 0 | 0 | 0 | 0 | 2 | 2 | 2 | 2 |

*FIG. 3*

LOCOMOTIVE TRANSIENT SMOKE CONTROL STRATEGY USING LOAD APPLICATION DELAY AND FUEL INJECTION TIMING ADVANCE

BACKGROUND OF THE INVENTION

The present invention is directed in general to an apparatus and method for decreasing the locomotive smoke emissions when the operator advances the throttle position, and more specifically to an apparatus and method that delays the application of load to the engine (until after the engine has accelerated to a higher speed) and modifies engine timing.

Recent amendments to United States environmental statutes and regulations require lowering the permitted emissions from locomotive diesel engines, including visible smoke. One such requirement is the reduction in $NO_x$ emissions, which can be effected by retarding the injection fuel timing of a locomotive diesel engine. But this timing modification negatively impacts fuel consumption and, therefore, it is desirable to increase the engine compression ratio to gain back some of the fuel consumption losses. However, increasing the compression ratio also increases the visible smoke emissions at partial loads. The problem of visible smoke is especially acute during transient load and speed changes, i.e., when the locomotive operator advances the throttle (i.e., moves the throttle to a higher notch position) to call for higher speed and/or greater load pulling capacity (i.e., horsepower). The smoke emissions tend to be worse when the throttle is advanced to higher throttle positions when starting from lower positions.

In the prior art locomotives, when the throttle is advanced from one position to the next (commonly referred to as notches) the diesel engine speed and the load (or excitation) applied to the traction motors are simultaneously increased to the next speed and horsepower point established for the new notch position. The engine acceleration to the new speed point is controlled by the electronic governing unit. Also, the locomotive control system applies more excitation to the main alternator, which in turn supplies more current to the traction motors, increasing the motor horsepower. While the speed and load are increasing to their new respective points, the fuel injection timing for the diesel engine is determined from a look-up table based on engine speed. As discussed above, during these notch or transient changes, undesirable smoke emissions are produced.

In the prior art locomotive systems, the electronic governing unit acts as the speed governor in response to speed changes requested by the locomotive control system. In the prior art, the speed governor does not receive any signals from the throttle when it is changed from one notch position to another and therefore does not know when a notch change has occurred; the speed governor knows only the speed demand. In fact, there are multiple notch settings that vary the horsepower delivered by the traction motors, but not the engine speed.

SUMMARY OF THE INVENTION

The above-mentioned undesirable visible smoke emissions during throttle notch changes (also referred to as transients) can be mitigated by the present invention, which relates to a novel and unobvious apparatus for controlling the engine timing and load application in such a way so as to favorably impact the visible smoke emission during throttle transients. In effecting these changes to the locomotive, it is necessary to ensure that the engine speed and load operating point for each notch position remain unchanged from the prior art so that the operational and handling characteristics of the locomotive arc unchanged and the locomotive operator can, therefore, use conventional techniques for controlling the locomotive.

BRIEF DESCRIPTION OF THE DRAWINGS

The present invention can be more easily understood and the further advantages and uses thereof more readily apparent, when considered in view of the description of the preferred embodiments and the following figures in which:

FIG. 2 depicts the timing advance duration associated with the present invention;

FIG. 3 depicts the load application delay times associated with the present invention;

DETAILED DESCRIPTION OF THE PREFERRED EMBODIMENTS

Figure 1:
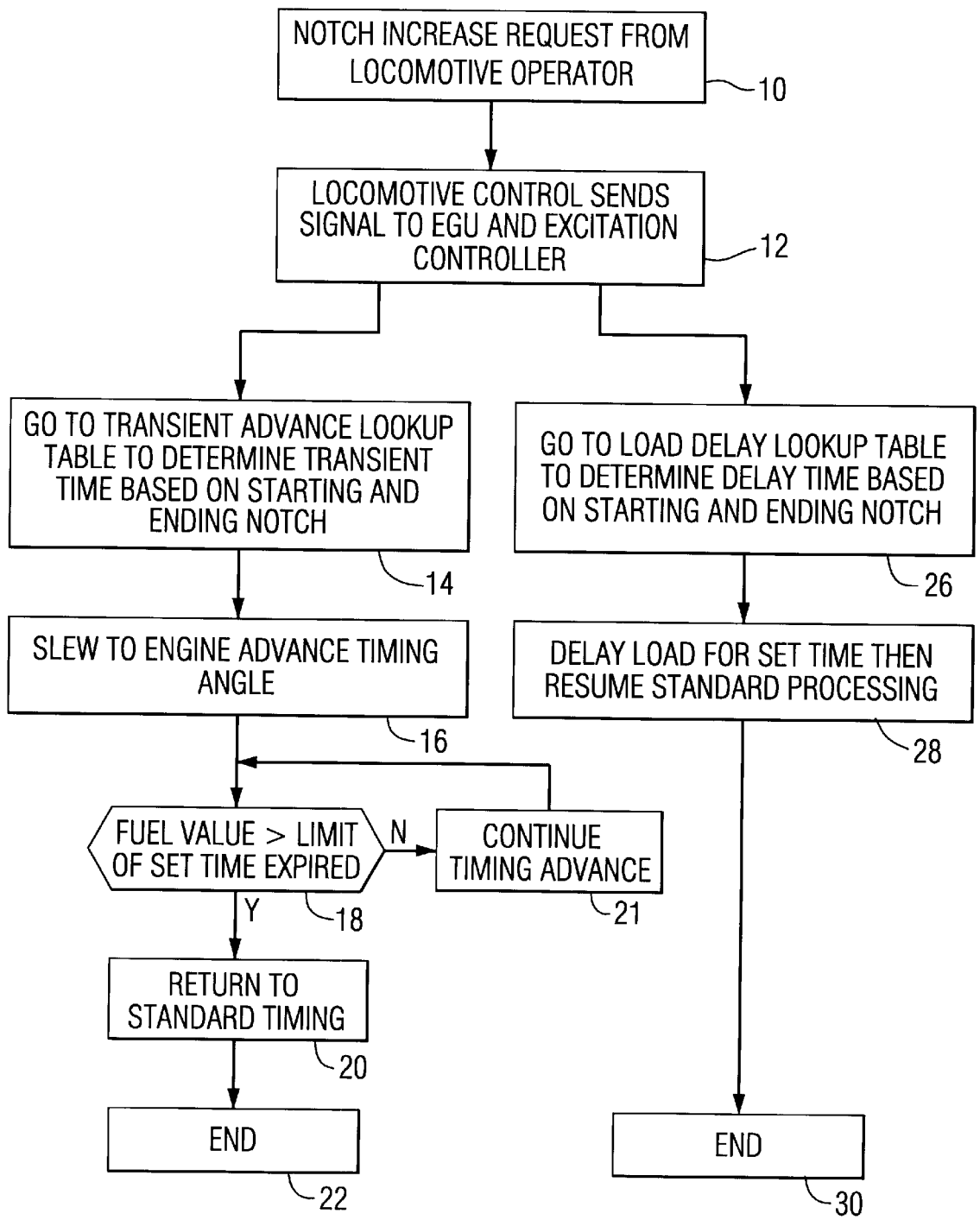
FIG. 1 is a flow chart illustrating the operation of the present invention.

Before describing in detail the particular transient smoke reduction system in accordance with the present invention, it should be observed that the present invention resides primarily in a novel combination of steps and apparatus related to smoke reduction in a railroad locomotive. Accordingly, these hardware components and method steps have been represented by conventional elements in the drawings, showing only those specific details that are pertinent to the present invention, so as not to obscure the disclosure with structural details that will be readily apparent to those skilled in the art having the benefit of the description herein.

In conjunction with the present invention, it has been shown that smoke reduction is more sensitive to load application delay when starting from lower notches and more sensitive to transient timing advancement when starting from higher notches. Further, it has been shown that the duration during which the timing advance is applied is as important as the quantitative value of the timing advance, in degrees.

FIG. 1 is a flow chart illustrating the operation of the present invention. At a step 10, the locomotive operator moves the throttle handle to a new, higher notch position. At a step 12, the locomotive control system (not shown in FIG. 1) senses the notch increase and sends a signal representing the new notch (horsepower) position to the excitation controller and a diesel engine speed request signal to the electronic governing unit of the diesel engine. The excitation controller controls the current provided to the traction alternator field windings and thereby the power delivered by the traction alternator to the traction motors. The electronic governing unit controls the fuel delivery to each engine cylinder and thereby the engine speed. Refer to commonly-owned U.S. Pat. No. 5,826,563; issued on Oct. 27, 1998, for further details of the excitation controller and electronic governing unit. At a step 14, a transient timing advance look-up table is consulted to determine the duration of the timing advance based on the starting and ending notch positions. This look-up table will be discussed further herein below. At a step 16, the timing is advanced. In one embodiment, the timing advance angle is not changed immediately (i.e., not a step change), but instead the timing advance angle is ramped from the current value to the desired value to avoid audible disturbances. In one embodiment, the ramp or slew rate is approximately 10° per second.

It should be noted that advancing the engine timing at high loads can cause excessive cylinder pressure. In a transient condition (a throttle notch position change) that ends in a high load condition, the advanced timing must be returned to the normal or standard timing value before the full load is achieved. This is accomplished by discontinuing the timing advance and returning to the normal timing value when the fuel value reaches a predetermined limit. This feature is implemented at a decision step 18. At the decision step 18, the fuel value is compared to a predetermined limit. If that limit is exceeded, then the result from decision step 18 is true and processing moves to a step 20 where the timing angle is returned to its standard value. Alternatively, at the decision step 18, a determination is made as to whether the time duration for the timing advance has expired. If the result is true, processing continues to the step 20 where the timing angle is returned to the standard value. As was the case with the change in timing advance angle at the step 16, here too at the step 20 the timing advance angle is not changed as a step function, but instead is ramped or slewed from its present value to the new value. If the result from the decision step 18 is false, processing moves to a step 21, which simply indicates that the timing advance is continued. Following the step 20, the timing advance process ends at a step 22.

The right hand side of FIG. 1 illustrates the load application delay aspect of the present invention. At a step 26, a load delay look-up table is consulted to determine the delay time based on the starting and ending notch positions. The look-up table will be discussed in detail below. The load change is delayed for the set time at a step 28 and then standard processing is resumed. The load application delay process ends at a step 30.

FIG. 2 is the timing advance look-up table referred to in the step 14 of FIG. 1. The values in the body of the table are in seconds and as shown are based on the starting and ending notch positions (or speeds). The notch positions are designated with the prefix "N". "LI" designates the low idle notch position and "ID" designates the idle notch position. The suffix "A" following the notch number indicates operation at high altitudes. Due to the lower air densities at higher altitudes, the notch settings for high altitude operation have different speeds associated therewith than the notch settings for conventional operation. The speed value (in revolutions per minute) corresponding to each notch position is shown either below or to the right of the notch value in FIG. 2. The values in the body of the table set forth the number of seconds for which the timing should be advanced.

The load application delay times are set forth in FIG. 3. The delay times are given in seconds and are dependent upon both the starting notch position (rows) and the ending notch position (columns). In accordance with the present invention, the load application delay feature is not required above notch number four. The delay time is measured from the time when the locomotive controller sends the signal to the electronic governing unit indicating a new notch position has been established. During multiple notch changes, the delay times are not additive, but instead the longest delay time for the given change controls the load application delay.

Figure 4:
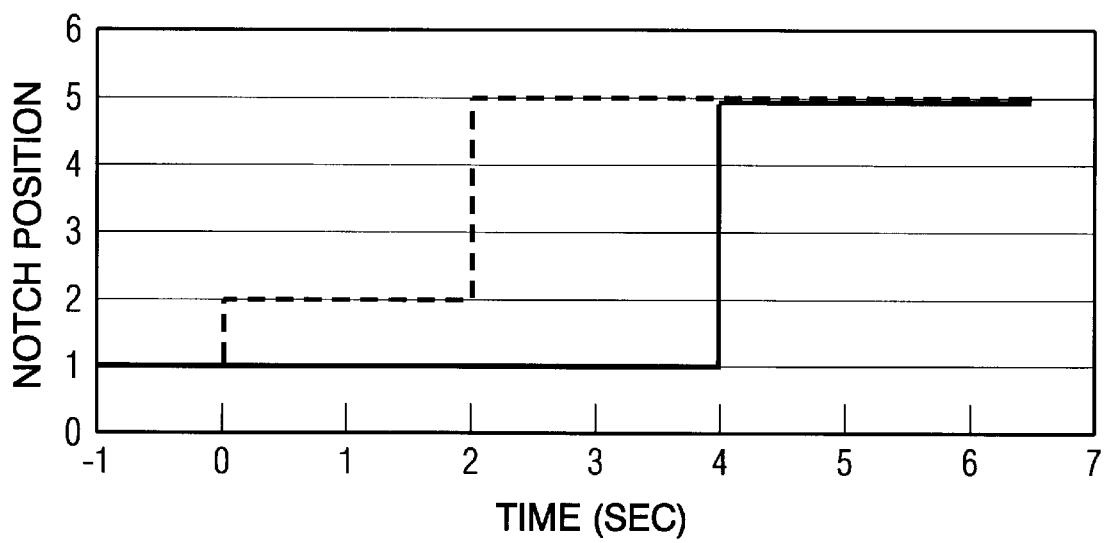
FIGS. 4, 5 and 6 are timing diagrams illustrating the load application delay process.
Figure 5:
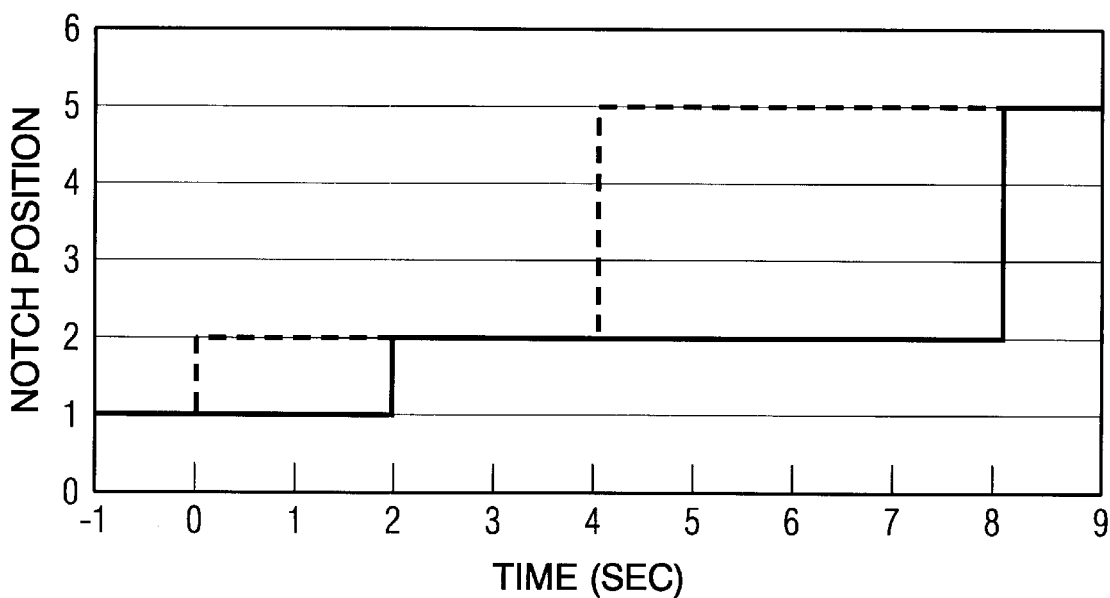
Figure 6:
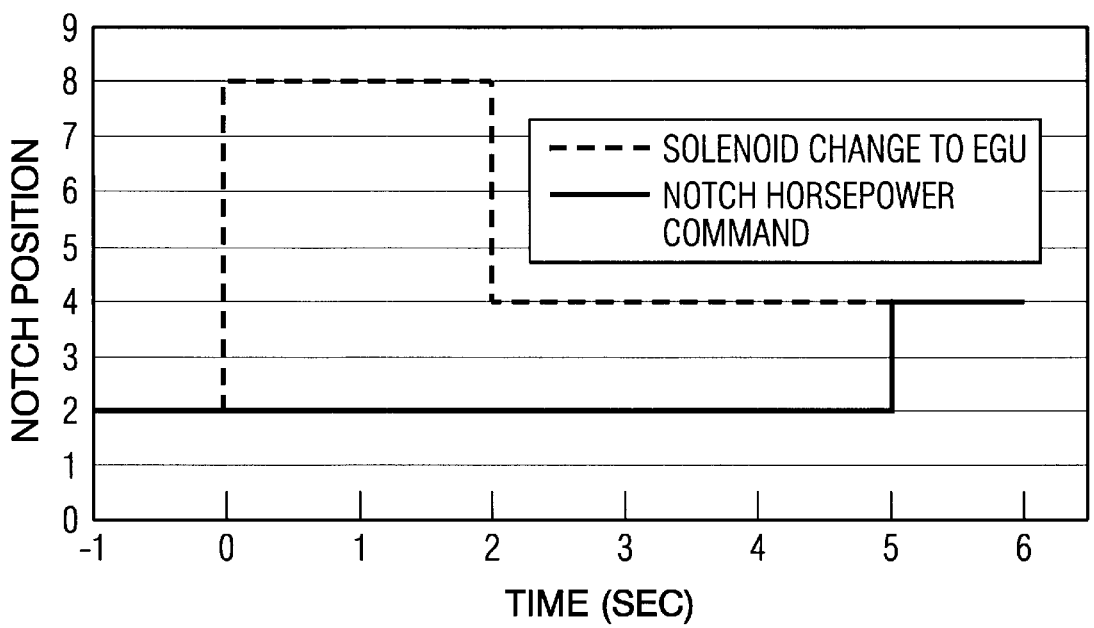

In FIGS. 4, 5 and 6, the dashed line represents the signal sent from the locomotive controller to the electronic governing unit in response to a notch change. The solid line represents the signal supplied from the locomotive controller to the excitation controller, requesting an increase in the current flow through the alternator, which in turn supplies more current to the traction motors, i.e., the load application signal. The vertical axis is notch position; the horizontal axis is time.

FIG. 4 illustrates an example where the throttle is moved from notch 1 to notch 2 at time zero, then after two seconds is moved to notch 5. The total load application delay (the solid line) is four seconds. Note that this is the same load application delay that would be encountered for notch change from position 1 directly to position 5.

Compare FIG. 4 with the situation illustrated in FIG. 5 where the throttle is moved from notch 1 to notch 2, at time zero, then after four seconds, is moved to notch 5. Here, the two second delay associated with the notch movement from position 1 to position 2 will have timed out prior to the subsequent notch movement to position 5. Therefore, the two notch changes act as two independent notch changes.

FIG. 6 illustrates a situation where the throttle is moved from notch 2 to notch 8, then after two seconds, moved back to notch 4. Here, the total load application delay is five seconds. This represents the sum of the delay for the notch movement from position 2 to position 4 directly. Since the delay for the notch 2 to the notch 8 did not time out, the invention uses the starting and ending notch delay time. Note that the change from notch position 8 to position 4 does not generate a load delay in accordance with the table of FIG. 3. Note also, as shown in FIGS. 2 and 3, moving from a higher to a lower notch position does not generate timing advances nor load application delays.

Figure 7:
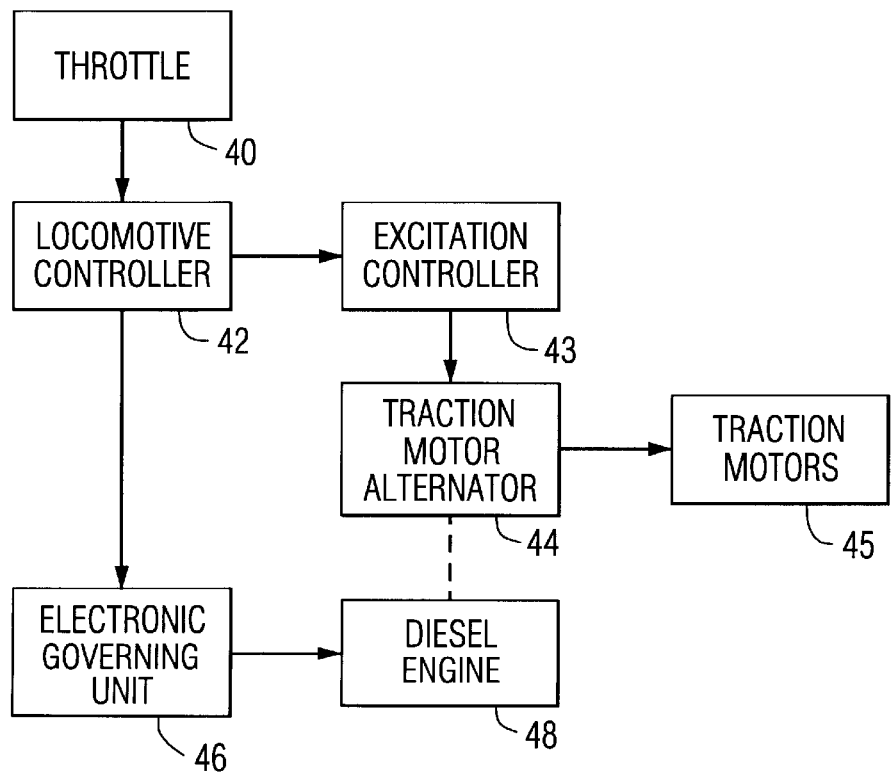
FIG. 7 is a block diagram showing the interaction of the key components of the present invention.

FIG. 7 illustrates the hardware elements associated with the present invention. A throttle 40 is controlled by the locomotive operator and includes the various notch positions discussed above. When the operator moves the throttle handle from one position to another, a signal indicating that change is supplied to the locomotive controller 42. Using the values as set forth in FIG. 3, and as set forth in the flow chart of FIG. 1, the locomotive controller 42 controls an excitation controller 43 to delay application of the additional energy required to supply the traction motor horsepower associated with the new throttle notch position. When the delay time has expired, the current supplied to traction motors 45 (only one traction motor is illustrated in FIG. 7) as provided by the traction motor alternator 44 as controlled by the excitation controller 43 is increased to deliver the commanded horsepower of the new throttle notch position. Also in response to the throttle notch adjustment, the locomotive controller 42 sends a corresponding signal to the electronic governing unit 46. The electronic governing unit 46 controls the engine speed as discussed in conjunction with the flow chart of FIG. 1. The engine timing angle is advanced for the period set forth in FIG. 2. When the period has expired, the electronic governing unit 46 commands return to the standard timing angle.

The flow chart of FIG. 1 (and the tables consulted during the flow charted process of FIG. 1, as set forth in FIGS. 2 and 3) can be executed by a processor, such as a computer. This implementation is well known in the art, and in fact the processor can be embodied within the locomotive controller FIG. 2 and the electronic governing unit 46 shown in FIG. 7. Instructions in a read-only memory control the basic operation of the processor and in an exemplary embodiment the flow chart of FIG. 1 (and the tables of FIGS. 2 and 3) can be set forth in a random access memory. Execution of the FIG. 1 flowchart includes the generation of control signals input to the diesel engine 48 and the traction motors 44, as shown in FIG. 7.

While the invention has been described with reference to a preferred embodiment, it will be understood by those skilled in the art that various changes may be made and equivalent elements may be substituted for elements thereof without departing from the scope of the present invention. In addition, modifications may be made to adapt a particular situation more material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling operation of a railroad locomotive, wherein the locomotive comprises a throttle for controlling a diesel engine having a plurality of cylinders wherein combustion occurs due to injection of the fuel into each cylinder, wherein the diesel engine is drivingly coupled to a traction alternator for supplying current to traction motors, wherein during operation of the locomotive the operator changes the throttle position, said method comprising the steps of:

(a) advancing diesel engine timing from a first value to a second value for a first predetermined time after a change in throttle position; and
    (b) delaying the generation of additional power by the traction alternator for a second predetermined time after a change in throttle position.

2. The method of claim 1 wherein after expiration of the first predetermined time, the diesel engine timing returns to the first value.

3. The method of claim 1 wherein the first predetermined time and the second predetermined time are functions of the direction and magnitude of the change in throttle position.

4. The method of claim 1 wherein the first predetermined time is determined from a look-up table having rows representing the initial throttle position and columns representing the final throttle position, and wherein the first predetermined time is set forth at the intersection of the applicable row and column.

5. The method of claim 1 wherein the engine timing is slewed from the first value to the second value.

6. The method of claim 1 wherein the diesel engine timing is returned to the first value at a predetermined slew rate when the quantity of fuel injected into each cylinder on a per stroke basis exceeds a fuel threshold.

7. The method of claim 1 wherein the second predetermined time is determined from a look-up table having rows representing the initial throttle position and columns representing the final throttle position, and wherein the second predetermined time is set forth at the intersection of the applicable row and column.

8. A method for controlling operation of a railroad locomotive, wherein the locomotive comprises a throttle for controlling the locomotive traction motors receiving power from a traction alternator drivingly coupled to a diesel engine, and wherein the operator changes the throttle position to operate the locomotive, said method comprising the step of delaying the generation of additional power by the traction alternator for a predetermined time after a throttle position change.

9. An apparatus for controlling operation of a railroad locomotive, wherein the locomotive comprises a throttle for controlling traction motors receiving power from a traction alternator drivingly coupled to a diesel engine, and wherein the operator changes the throttle position as required during operation of the locomotive, said apparatus comprising:

a locomotive controller for generating a signal in response to the throttle position change;
    an electronic governing unit for advancing the timing of the diesel engine for a predetermined time in response to said signal; and
    an excitation controller for providing current to the traction alternator, wherein said excitation controller is responsive to said signal for delaying application of a current change to the traction alternator for a second predetermined time, and wherein in turn, the traction alternator delays application of a power change to the traction motors for said second predetermined time.

10. The apparatus of claim 9 wherein the first and the second predetermined times are functions of the direction and magnitude of the change in throttle position.

11. The apparatus of claim 9 wherein the first predetermined time is determined from a look-up table having rows representing the initial throttle position and columns representing the final throttle position, and wherein the first predetermined time is set forth at the intersection of the applicable row and column.

12. The apparatus of claim 9 wherein the diesel engine timing is returned to the first value when the quantity of fuel injected into each cylinder on a per stroke basis exceeds a fuel threshold.

13. The apparatus of claim 9 wherein the second predetermined time is determined from a look-up table having rows representing the initial throttle position and columns representing the final throttle position, and wherein the second predetermined time is set forth at the intersection of the applicable row and column.

14. An apparatus for controlling operation of a railroad locomotive, wherein the locomotive comprises a throttle for controlling traction motors receiving power from a traction alternator drivingly coupled to a diesel engine, and wherein the operator changes the throttle position as required during operation of the locomotive, said apparatus comprising:

means for generating a signal in response to the throttle position change;
    means for advancing the timing of the diesel engine for a predetermined time in response to said signal; and
    means for providing electrical energy to the traction motors, wherein said means is responsive to said signal for delaying application of an electrical energy change to the traction motors in response to said signal.

\* \* \* \* \*